United States Patent
Cheng et al.

(10) Patent No.: US 11,208,574 B2
(45) Date of Patent: Dec. 28, 2021

(54) MOLDED STRUCTURES OF POLYCARBONATE BASED SUBSTRATES OVER MOLDED WITH SILICONE RUBBERS

(71) Applicant: TRINSEO EUROPE GMBH, Horgen (CH)

(72) Inventors: Kai-Leung Larry Cheng, Hong Kong (HK); Chang Wu Hung, Taoyuan (TW); Claude T. Van Nuffel, Oostakker (BE); Chia-Wei Wade Chang, Hsinchu (CN)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 16/078,271

(22) PCT Filed: Feb. 24, 2017

(86) PCT No.: PCT/EP2017/054314
§ 371 (c)(1),
(2) Date: Aug. 21, 2018

(87) PCT Pub. No.: WO2017/144656
PCT Pub. Date: Aug. 31, 2017

(65) Prior Publication Data
US 2019/0031916 A1   Jan. 31, 2019

(30) Foreign Application Priority Data
Feb. 26, 2016   (EP) .................... 16157604

(51) Int. Cl.
| | |
|---|---|
| *C09D 183/04* | (2006.01) |
| *C09D 183/14* | (2006.01) |
| *C09D 7/63* | (2018.01) |
| *C08G 77/12* | (2006.01) |
| *C08K 5/5419* | (2006.01) |
| *C08G 77/14* | (2006.01) |
| *C08K 5/5425* | (2006.01) |
| *C08G 77/16* | (2006.01) |
| *C08G 77/20* | (2006.01) |
| *C08L 69/00* | (2006.01) |

(52) U.S. Cl.
CPC ............ *C09D 183/04* (2013.01); *C09D 7/63* (2018.01); *C09D 183/14* (2013.01); *C08G 77/12* (2013.01); *C08G 77/14* (2013.01); *C08G 77/16* (2013.01); *C08G 77/20* (2013.01); *C08K 5/5419* (2013.01); *C08K 5/5425* (2013.01); *C08L 69/00* (2013.01)

(58) Field of Classification Search
CPC ....... C08L 69/00; C08L 83/06; C08K 5/5419; C08K 5/5425; C08G 77/12; C08G 77/14; C08G 77/16; C08G 77/20; C09D 183/04; C09D 183/14; C09D 7/63
See application file for complete search history.

(56) References Cited

U.S. PATENT DOCUMENTS

| | | | |
|---|---|---|---|
| 4,267,023 A | 5/1981 | Frant et al. | |
| 4,721,750 A | 1/1988 | Nakamura et al. | |
| 5,366,805 A | 11/1994 | Fujiki et al. | |
| 5,508,344 A * | 4/1996 | Mason | C08L 67/02 524/109 |
| 5,792,812 A | 8/1998 | Fujiki et al. | |
| 6,069,206 A | 5/2000 | Nishihara et al. | |
| 6,512,077 B1 | 1/2003 | Miyamoto et al. | |
| 8,181,330 B2 | 5/2012 | Kato et al. | |
| 2003/0170469 A1 | 9/2003 | Ikuta et al. | |
| 2007/0049703 A1* | 3/2007 | Murray | C08L 69/00 525/439 |
| 2008/0073288 A1 | 3/2008 | Fan et al. | |
| 2010/0136073 A1 | 6/2010 | Preuss et al. | |
| 2011/0147992 A1* | 6/2011 | Norimatsu | C08K 5/5393 264/299 |
| 2012/0111489 A1 | 5/2012 | Weinberg | |
| 2012/0244095 A1 | 9/2012 | Konradi et al. | |
| 2013/0131271 A1 | 5/2013 | Yokogi et al. | |

FOREIGN PATENT DOCUMENTS

| | | |
|---|---|---|
| CN | 1144531 A | 3/1997 |
| CN | 1625418 A | 6/2005 |

(Continued)

OTHER PUBLICATIONS

Yamazaki, Toshio. "Silicone rubber supporting IT application of selective self-adhesive LSR for keypads of mobile phone." Nippon Gomu Kyokaishi (2006), 79(8), 388-392.
Chinese Office Action in Chinese Application No. 201780009707.0.

* cited by examiner

*Primary Examiner* — Callie E Shosho
*Assistant Examiner* — Krupa Shukla
(74) *Attorney, Agent, or Firm* — Young Basile Hanlon & MacFarlane, P.C.

(57) ABSTRACT

Articles comprising: a molded substrate comprising one or more polycarbonate resins or blends of polycarbonate and polyester resins containing polydimethyl siloxanes modified with one or more of acrylate, hydroxyl or epoxy groups and disposed on the surface or a portion of the surface of the substrate is a cured silicone rubber; wherein the one or more polycarbonate resins or blends of polycarbonate and polyester resins contain the modified polydimethyl siloxanes in sufficient amount such that the peel strength is increased. Compositions comprising one or more polycarbonate resins or blends of polycarbonate and polyester resins containing polydimethyl siloxanes modified with one or more of acrylate, hydroxyl or epoxy groups in an amount of about 0.1 to less than 1.0 percent by weight. Methods for preparing the articles are disclosed.

15 Claims, No Drawings

(56) References Cited

U.S. PATENT DOCUMENTS

| | | | | |
|---|---|---|---|---|
| 2013/0196131 A1* | 8/2013 | Malinoski | ............. | C08K 5/526 |
| | | | | 428/220 |
| 2013/0224462 A1* | 8/2013 | van der Mee | ......... | C09K 21/14 |
| | | | | 428/220 |
| 2014/0155549 A1* | 6/2014 | Swinnen | ................ | C08L 67/02 |
| | | | | 525/101 |
| 2015/0198760 A1 | 7/2015 | Wilcox et al. | | |
| 2016/0075861 A1* | 3/2016 | Kumru | .................... | C04B 26/04 |

FOREIGN PATENT DOCUMENTS

| | | |
|---|---|---|
| CN | 104262927 A | 1/2015 |
| CN | 105120950 A | 12/2015 |
| EP | 244952 A2 | 11/1987 |
| EP | 0601882 A1 | 6/1994 |
| EP | 540259 B1 | 3/1998 |
| EP | 1217040 A1 | 6/2002 |
| EP | 0722990 B1 | 8/2002 |
| EP | 2688405 A1 | 1/2014 |
| EP | 2878621 A1 | 6/2015 |
| EP | 2899213 A1 | 7/2015 |
| EP | 2899214 A1 | 7/2015 |
| GB | 2514444 A | 11/2014 |
| JP | 3116760 U | 12/2005 |
| JP | 04475797 B2 | 3/2010 |
| JP | 04717074 B2 | 4/2011 |
| JP | 2013241522 A | 12/2013 |
| KP | 20030051441 | 6/2003 |
| KP | 1020090119054 | 11/2009 |
| TW | 200906925 A | 2/2009 |
| WO | 1998050522 A1 | 11/1998 |
| WO | 03018692 A1 | 3/2003 |
| WO | 2009065023 A1 | 5/2009 |
| WO | 2015199853 A1 | 12/2015 |

MOLDED STRUCTURES OF POLYCARBONATE BASED SUBSTRATES OVER MOLDED WITH SILICONE RUBBERS

This application is a national stage application of PCT/EP2017/054314 filed 24 Feb. 2017 and claims priority from EP 16157604.6 filed 26 Feb. 2016, all of which are incorporated herein by reference in their entirety for all purposes.

FIELD

The disclosure relates to articles comprising molded polycarbonate substrates having silicone rubber bonded to the surface or a portion thereof wherein the polycarbonate substrate contains a modifier to improve the bond between the polycarbonate surface and the silicone rubber. The disclosure also relates to methods of preparing the molded polycarbonate structures.

BACKGROUND

Polycarbonate and blends of polycarbonate and polyester are utilized in a wide variety of molded structures, for instance automotive parts, medical devices, medical device components, electronic device components, such as cell phones, glasses, goggles, such as virtual reality googles and safety goggles. Polycarbonates and blends of polycarbonates and polyesters form structures that are rigid which have rigid surfaces. Rigid surfaces can be irritating to users. To reduce or prevent structures formed from polycarbonate and blends of polycarbonate and polyester from irritating users, softer materials such as cured silicon rubbers are over-molded onto the surfaces or a portion of the surfaces of such structures. Cured silicon rubbers do not bond well to the surfaces of molded polycarbonates and blends of polycarbonates and polyesters. A number of references disclose methods of enhancing the bonding of silicon rubber in the cured state to polycarbonates and blends of polycarbonates and polyesters, see Fujiki U.S. Pat. No. 5,366,805; Fujiki U.S. Pat. No. 5,792,812; Fujiki EP 0540259; EP 0601882; and EP0722990. The market demands cost effective solutions that further enhance the bond strength of silicon rubber to molded polycarbonates and blends of polycarbonates and polyesters What is needed are articles of molded polycarbonates or blends of polycarbon-ates and polyesters over-molded with cured silicon rubber which exhibit good bond strength between the polycarbonate or blends of polycarbonate and polyester and the cured silicon rubber. What are also needed are compositions of polycarbonates or blends of polycarbonates and polyesters that are capable of forming strong bonds with cured silicon rubber. What are also needed are methods for forming articles of molded polycarbonate or blends of polycarbonate and polyesters over-molded with cured silicon rubber wherein the resulting structures exhibits good bonding between structures of molded polycarbonates or blends of polycarbonate and polyesters and cured silicon rubber.

SUMMARY

Disclosed are articles comprising: a molded substrate comprising one or more polycarbonate resins or blends of polycarbonate and polyester resins containing polydi-methyl siloxanes modified with one or more of acrylate, hydroxyl or epoxy groups and disposed on the surface or a portion thereof of the substrate is a cured silicone rubber; wherein the one or more polycarbonate resins or blends of polycarbonate and polyester resins contain the modified polydimethyl siloxanes in sufficient amount such that the peel strength of the cured silicone rubber from the molded substrates after curing is enhanced.

Disclosed are compositions useful in preparing the articles which comprise one or more polycarbonate resins or blends of polycarbonate and polyester resins containing polydimethyl siloxanes modified with one or more of acrylate, hydroxyl or epoxy groups in an amount of about 0.1 to less than 1.0 percent by weight of the compositions.

The polycarbonate resins or blends of polycarbonate and polyester resins may comprise one or more reinforcing fibers, such as glass fibers; one or more pigments; one or more internal mold release compounds, organic stearates; and the like. The modified polydimethyl siloxanes may be modified with acrylate groups. The modified polydimethyl siloxanes may be disposed on a carrier. The carrier may comprise fumed silica.

Disclosed is a method comprising: a) molding a substrate from a composition one or more polycarbonate resins or blends of polycarbonate and polyester resins containing polydimethyl siloxanes modified with one or more of acrylate, hydroxyl or epoxy groups; b) applying a mixture comprising one or more polysiloxanes containing one or more unsaturated groups, one of more polysiloxanes containing one or more S—H groups; and one or more platinum or rhodium based catalysts to the surface or a portion thereof of the substrate; and c) exposing the mixture of one or more polysiloxanes containing one or more unsaturated groups, one of more polysiloxanes containing one or more S—H groups; and one or more platinum or rhodium based catalysts to conditions such that a cured silicone rubber layer is disposed on the surface or a portion thereof of the substrate.

The articles exhibit excellent bonding strength between the substrate comprising one or more polycarbonate resins or blends of polycarbonate and polyester containing polydimethyl siloxanes modified with one or more of acrylate, hydroxyl or epoxy groups and the cured silicone rubber. For example the peel strength of the cured silicone rubber from an unfilled substrate after curing at 115° C. for 5 minutes may be about 1.80 kg/mm or greater, the substrate having a thickness of 0.3 mm. The articles disclosed exhibit an improved peel strength of about 20 percent or about 30 percent. Articles disclosed may find use in automotive parts, medical devices or consumable items, googles, cases for electronics, toys, and infant care devices, and the like.

DETAILED DESCRIPTION

The explanations and illustrations presented herein are intended to acquaint others skilled in the art with the disclosure, its principles, and its practical application. Accordingly, the specific embodiments of the present disclosure as set forth are not intended as being exhaustive or limiting of the claims. The scope of the claims should, therefore, be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Disclosed are compositions comprising one or more polycarbonate resins or blends of polycarbonate and polyester resins containing polydimethyl siloxanes modified with one or more of acrylate, hydroxyl or epoxy groups; wherein the amount of the modified polydimethyl siloxanes is sufficient such that the strength of the bond of cured silicone rubber to a substrate molded from the one or more polycarbonate resins or blends of polycarbonate and polyester resins is sufficiently strong for the anticipated use of articles formed from the substrates and the cured rubber coating. These compositions facilitate the manufacture of molded articles having a cured silicone coating overmolded on the substrates.

The articles disclosed may further comprise any one or more of the features described in this specification in any combination, including the preferences and examples listed in this specification, and includes the following features: the one or more polycarbonate resins or blends of polycarbonate and polyester resins contain from about 0.1 to about 2.0 percent by weight of the modified polydimethyl siloxane; the one or more polycarbonate resins or blends of polycarbonate and polyester resins may contain from about 0.1 to about 1.0 percent by weight of the modified polydimethyl siloxane; the one of more polycarbonates blends of polycarbonate and polyester resins exhibit a composite melt flow rate of about 3 to 20 g/10 minutes; the modified polydimethyl siloxanes are modified with acrylate groups; the modified polydimethyl siloxanes are disposed on a carrier; the modified polydimethyl siloxanes are disposed on a carrier comprising fumed silica; the one or more polycarbonate resins or blends of polycarbonate and polyester resins contain reinforcing fibers; the reinforcing fibers comprise glass fibers; the one or more polycarbonate resins or blends of polycarbonate and polyester resins contain one or more pigments; the one or more polycarbonate resins or blends of polycarbonate and polyester resins contain one or more internal mold release compounds; the one or more internal mold release compounds comprise organic stearates; or the silicone rubber comprises the reaction product of an alkenyl group-containing organopolysiloxane and an organohydrogenpolysiloxane having at least two hydrogen atoms each directly attached to a silicon atom in a molecule.

The compositions disclosed may further comprise any one or more of the features described in this specification in any combination, including the preferences and examples listed in this specification, and includes the following features: the one or more polycarbonate resins or blends of polycarbonate and polyester resins contain from about 0.1 to less than 1.0 percent by weight of the modified polydimethyl siloxane; the one or more polycarbonate resins or blends of polycarbonate and polyester resins contain reinforcing fibers; the reinforcing fibers comprise glass fibers; the one or more polycarbonate resins or blends of polycarbonate and polyester resins contain one or more pigments; the one or more polycarbonate resins or contain one or more internal mold release compounds; the one or more internal mold release compounds comprise organic stearates; the modified polydimethyl siloxanes are modified with acrylate groups; the modified polydimethyl siloxanes are disposed on a carrier; and the modified polydimethyl siloxanes are disposed on a carrier comprising fumed silica.

One or more as used herein means that at least one, or more than one, of the recited components may be used as disclosed. Heteroatom means nitrogen, oxygen, sulfur and phosphorus, more preferred heteroatoms include nitrogen and oxygen. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloali-phatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenyl-ene, alkarylene and aralkylene. As used herein percent by weight or parts by weight refer to, or are based on, the weight of the curable compositions unless otherwise specified.

Polycarbonate as used herein means a polymer containing carbonate units. Such polymers may be homopolymers consisting essentially of carbonate monomer units or copolymers containing one or more other monomer units (co-monomer units). Such copolymers may be block copolymers containing two or more blocks of different monomer units or may be random copolymers with the different monomer units randomly located along the polymer backbone. The other monomer units may comprise any monomer units that do not negatively impact the inherent properties of polycarbonates, for instance heat resistance, impact resistance, moldability and transparency, where required for the intended use. Among exemplary comonomer units are ester units and polysiloxane units. The amount of carbonate monomer units in copolycarbonates is selected such that the resulting polymer retains the desirable properties of polycarbonates, for instance heat resistance, impact resistance, moldability and transparency, where required for the intended use. The copolycarbonates may contain about 75 mole percent or greater carbonate monomer units, about 80 mole percent or greater carbonate monomer units or about 85 mole percent or greater carbonate monomer units. The copolycarbonates may contain about 99 mole percent or less carbonate monomer units, about 97 mole percent or less carbonate monomer units or about 95 mole percent or less carbonate monomer units. The copolycarbonates may contain about 1 mole percent or greater co-monomer monomer units, about 3 mole percent or greater co-monomer monomer units or about 5 mole percent or greater co-monomer monomer units. The copolycarbonates may contain about 25 mole percent or less co-monomer monomer units, about 20 mole percent or less co-monomer monomer units or about 15 mole percent or less co-monomer monomer units. The polycarbonate units may contain aromatic units in the backbone of the polymer.

The production of aromatic polycarbonates is effected, for example, by the reaction of diphenols with carbonic acid halides, preferably phosgene, and/or with aromatic dicarboxylic acid dihalides, preferably benzenedicarboxylic acid dihalides, by the phase boundary method, optionally with the use of chain terminators, e.g., monophenols, and optionally with the use of trifunctional branching agents or branching agents with a functionality higher than three, for example triphenols or tetraphenols. Diphenols for the production of the aromatic polycarbonates and/or aromatic polyester carbonates may correspond to formula I

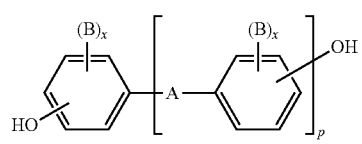

wherein A denotes a single bond, a $C_1$-$C_5$ alkylene, a $C_2$-$C_5$ alkylidene, a $C_5$-$C_6$ cycloalkylidene, —O—, —SO—, —CO—, —S—, —SO$_2$—, or a $C_6$-$C_{12}$ arylene, on to which other aromatic rings, which optionally contain hetero atoms, can be condensed, or a radical of formula II or III:

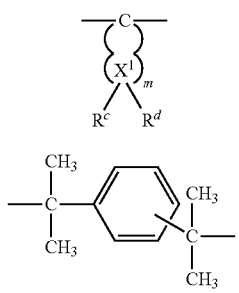

Wherein B in each case is independently hydrogen, a $C_1$-$C_{12}$ alkyl, preferably methyl, or a halogen, preferably chlorine and/or bromine;
x in each case is mutually independently 0, 1, or 2;
p is 0 or 1;
$R^c$ and $R^d$ are mutually independent of each other and are individually selectable for each $X^1$ and are hydrogen or a $C_1$-$C_6$ alkyl, preferably hydrogen, methyl or ethyl; $X^1$ denotes carbon; and
m denotes an integer from 4 to 7, preferably 4 or 5, with the proviso that $R^c$ and $R^d$ simultaneously denote an alkyl on at least one $X^1$ atom.

Exemplary diphenols are hydroquinone, resorcinol, dihydroxybiphenyls, bis(hydroxyphenyl)-$C_1$-$C_5$ alkanes, bis(hydroxyphenyl)-$C_5$-$C_6$ cycloalkanes, bis(hydroxyl-phenyl) ethers, bis(hydroxyphenyl)sulfoxides, bis(hydroxyphenyl) ketones, bis(hydroxyl-phenyl)sulfones and 4,4"-bis(hydroxyphenyl)diisopropylbenzenes, as well as derivatives thereof which have brominated and/or chlorinated nuclei. Diphenols which are particularly preferred are 4,4'-dihydroxybiphenyl, bisphenol A, 2,4-bis(4-hydroxyphenyl)-2-methyl-butane, 1,1-bis(4-hydroxyphenyl)-cyclohexane, 1,1-bis(4-hydroxyphenyl)-3,3,5-trimethyl-cyclohexane, 4,4-dihydroxydiphenyl sulfide and 4,4-dihydroxydiphenyl sulfone, as well as di- and tetrabrominated or chlorinated derivatives thereof, such as 2,2-bis(3-chloro-4-hydroxyphenyl)propane, 2,2-bis-(3,5-dichloro-4-hydroxyphenyl)propane or 2,2-bis(3,5-dibromo-4-hydroxyphenyl)propane. 2,2-bis-(4-hydroxyphenyl)propane (bisphenol A) is particularly preferred. The diphenols can be used individually or as arbitrary mixtures. The diphenols are known from the literature or can be obtained by methods known from the literature. Apart from bisphenol A homopolycarbonates, the preferred polycarbonates are the copolycarbonates of bisphenol A with up to 15 mole percent, with respect to the molar sums of the diphenols, of other diphenols which are cited as preferred or particularly preferred, in particular 2,2-bis(3,5-dibromo-4-hydroxyphenyl)-propane.

Exemplary chain terminators for the production of the aromatic polycarbonates include phenolic compounds, exemplary phenolic compounds include phenol, p-chlorophenol, p-tert-butylphenol, 4-(1,3-dimethyl-butyl)-phenol and 2,4,6-tribromophenol; long chain alkylphenols, such as monoalkylphenols or dialkylphenols which contain a total of 8 to 20 C atoms in their alkyl substituents, exemplary are 3,5-di-tert-butyl-phenol, p-iso-octylphenol, p-tert-octylphenol, p-dodecylphenol, 2-(3,5-dimethylheptyl)-phenol and 4-(3,5-dimethylheptyl)-phenol. The amount of chain terminators used may be about 0.1 mole percent or greater based on the molar sum of the diphenols used in each case. The amount of chain terminators used may be about 10 mole percent or less based on the molar sum of the diphenols used in each case.

The aromatic polycarbonates can be branched in the known manner, for example by the incorporation of about 0.05 to about 2.0 mole percent, with respect to the sum of the diphenols used, of trifunctional compounds or of compounds with a functionality higher than three, for example those which contain three or more phenolic groups. Branched polycarbonates suitable for the present invention can be prepared by known techniques, for example several suitable methods are disclosed in U.S. Pat. Nos. 3,028,365; 4,529,791; and 4,677,162; which are hereby incorporated by reference in their entirety. Exemplary branching agents that may be used are tri- or multi-functional carboxylic acid chlorides, such as trimesic acid trichloride, cyanuric acid trichloride, 3,3'-,4,4'-benzophenonetetracarboxylic acid tetrachloride, 1,4,5,8-naphthalene-tetracarboxylic acid tetrachloride or pyromellitic acid tetrachloride for example, in amounts of about 0.01 to about 1.0 mole percent (with respect to the dicarboxylic acid dichlorides used) or tri- or multi-functional phenols such as phloroglucinol, 4,6-dimethyl-2,4,6-tris(4-hydroxyphenyl)-2-heptene, 4,4-dimethyl-2,4,6-tris(4-hydroxyphenyl)heptane, 1,3,5-tris(4-hydroxyphenyl)-benzene, 1,1,1-tris(4-hydroxyphenyl)ethane, tris(4-hydroxyphenyl)-phenyl-methane, 2,2-bis[4,4-bis(4-hydroxyphenyl)cyclohexyl]-propane, 2,4-bis[1-(4-hydroxyphenyl)-1-methyl-ethyl]phenol, tetrakis(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)propane, or tetrakis(4-[1-(4-hydroxyphenyl)-1-methylethyl]-phenoxy)-methane in amounts of about 0.01 to about 1.0 mole percent with respect to the diphenols used. Phenolic branching agents can be placed in the reaction vessel with the diphenols. Acid chloride branching agents can be introduced together with the acid chlorides.

Copolycarbonates may be prepared by known processes in the art. In one exemplary embodiment, about 1 to about 25 parts by weight, preferably about 2.5 to about 25 parts by weight (with respect to the total amount of diphenols to be used) of polydiorganosiloxanes comprising hydroxy-aryloxy terminal groups can also be used. These are known (see, for example, U.S. Pat. No. 3,419,634) or can be produced by methods known from the literature. In another embodiment ester forming monomers may be utilized in the polycarbonate containing polymer preparation process. Exemplary ester forming monomers include dicarboxylic acid halides and hydroxycarboxylic acids, The preferred aromatic dicarboxylic acid dihalides for the production of the aromatic polyester carbonates are the diacid dichlorides of isophthalic acid, terephthalic acid, diphenyl ether-4,4'-dicarboxylic acid and naphthalene-2,6-dicarboxylic acid. Mixtures of the diacid dichlorides of isophthalic acid and terephthalic in a ratio from about 1:20 to about 20:1 are particularly preferred. A carbonic acid halide, preferably phosgene, is used in conjunction as a difunctional acid derivative during the production of the polyester carbonates. The aromatic polyester carbonates may also contain incorporated hydroxycarboxylic acids. The aromatic polyester carbonates may be either linear or may be branched. Suitable branching agents are disclosed hereinabove.

Apart from the aforementioned monophenols, exemplary chain terminators for the production of the aromatic polyester carbonates include chlorocarboxylic acid esters thereof, as well as the acid chlorides of aromatic monocarboxylic acids which may optionally be substituted by $C_1$-$C_{22}$ alkyl groups, or by halogen atoms, and also include aliphatic $C_2$-$C_{22}$ monocarboxylic acid chlorides. The amount of chain terminator is about 0.1 to about 10 mole percent in each case, with respect to the moles of diphenols in the case of phenolic chain terminators and with respect to the moles of dicarboxylic acid dichlorides in the case of monocarboxylic acid chloride chain terminators.

The one or more polymers containing carbonate monomer units can comprise polycarbonates, co-polycarbonates or blends of polycarbonates and co-polycarbonates. The polycarbonates and/or co-polycarbonates may exhibit a mean weight average molecular weight sufficient to provide the desired properties to articles prepared from the polycarbonates and/or co-polycarbonates as described hereinbefore. The polycarbonates and/or co-polycarbonates may have a mean weight average molecular weights of about 8,000 or greater, about 15,000 or greater or about 30,000 or greater. The polycarbonates and/or co-polycarbonates may have a mean weight average molecular weight of about 200,000 or less, about 80,000 or less, or about 40,000 or less. Unless otherwise indicated, the references to polycarbonate and/or co-polycarbonate "molecular weight" herein refer to weight average molecular weights (Mw) determined by gel permeation chromatography (GPC) using laser scattering techniques with a bisphenol A polycarbonate standard and is given in units of grams per mole (g/mole). Preferably, the melt flow rate (MFR) of the polycarbonate and/or co-polycarbonate is sufficient to allow use of the blends to prepare desired articles therefrom. Preferably the melt flow rate is from about 3 to about 20 grams per 10 minutes (g/10 min) as determined at 300° C. under a load of 1.2 kg.

The polycarbonates and/or co-polycarbonates may be used in pellet form, powder form or in a mixture thereof. Where used in powder form the particle size is selected for efficiently blending the materials. The particle size may be about 0.1 mm or greater or about 0.5 mm or greater. The particle size may be about 2.0 mm or less or about 1.5 mm or less.

The polycarbonates and/or co-polycarbonates are utilized in a sufficient amount to provide articles prepared therefrom a high level of heat resistance, impact resistance, moldability and transparency where desired. Where the polycarbonates are used in a blend, the polycarbonate may be present as a continuous phase. The one or more polycarbonates and/or co-polycarbonates may be present in an amount of about 5 percent by weight or greater based on the weight of the composition, about 25 percent by weight or greater or about 30 percent by weight or greater. The one or more polycarbonates and/or co-polycarbonates may be present in an amount of about 99.9 percent by weight based on the weight of the composition, about 95 percent by weight or less, about 85 percent by weight or less or about 75 percent by weight or less.

The composition may contain one or more polyesters. Any polyester that improves the resistance of the composition or articles prepared therefrom to damage due to exposure to chemicals may be utilized. The one or more polyesters and the one or more polycarbonates may form separate phases. The polyester phase may be a discontinuous phase. The polyesters may be aromatic polyesters. Exemplary reactants for making the polyester, include hydroxycarboxylic acids, and diols and dicarboxylic acids either or both of which can be aliphatic or aromatic. Among exemplary polyesters are poly(alkylene alkanedicarboxylates), poly(alkylene phenylenedicarboxylates), poly(phenylene alkanedi-carboxylates), and poly(phenylene phenylenedicarboxylates). Alkyl portions or the poly-mer chains can be substituted with, for example, halogens, alkoxy groups or alkyl side chains and can contain divalent heteroatomic groups (such as —O—, —S— or —SO2-) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms. Typical alkylene diols used in ester formation are the $C_2$ to $C_{10}$ glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxy-phenyl) propane. Aromatic diacids include, for example, terephthalic acid, isophthalic acid, naphthalene dicarboxylic acid, ciphenyletherdicarboxylic acid, diphenyldicarboxylic acid, diphenylsulfonedicarboxylic acid, diphenoxyethanedicarbocylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, may be used. For example, use of cyclo-hexanedimethylol together with ethylene glycol reacted with terephthalic acid forms a clear, amorphous copolyester (PETG) of particular interest. Also contemplated are liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl. Aromatic polyesters such as the poly(alkylene phenylenedicarboxy-lates), polyethylene terephthalate (PET) and polybutylene terephthalate (PBT), or mixtures thereof, are particularly useful.

Methods and materials useful for the production of polyesters, as described above, are discussed in greater detail in U.S. Pat. Nos. 2,465,319; 3,047,539; and 3,756,986, each of which is incorporated herein by reference. Polyesters may be made by a variety of methods. Although the self-esterification of hydroxycarboxylic acids is known, direct esterification, which involves the reaction of a diol with a dicarboxylic acid with the resulting elimination of water, is a more frequently used method for commercial production, giving an -[-AABB-]- polyester. Although the presence of a catalyst such as p-toluene sulfonic acid, a titanium alkoxide or a dialkyltin oxide is helpful, the primary driving force behind the direct esterification reaction is heat. Temperatures applied exceed the melting points of the reactants and typically approach the boiling point of the diol being used, and usually range from about 150° C. to about 280° C. An excess of the diol is typically used, and once all of the acid has reacted with diol, the excess diol is removed by distillation with the application of additional heat under reduced pressure. The ester of the diacid initially formed from the diol, having —OH end groups, undergoes alcoholysis and polymerization to form polymeric esters and the diol is split out as a byproduct and removed from the reaction zone. The reaction is typically carried out in the presence of an inert gas.

Alternatively ester-forming derivatives of a dicarboxylic acid can be heated with a diol to obtain polyesters in an ester interchange reaction. Exemplary acid derivatives for such purpose are esters, halides, salts or anhydrides of the acid. When a bis ester of the diacid is used for purposes of the interchange reaction, the alcohol from which the ester is formed (the alcohol to be displaced) may be lower boiling than the diol to be used for formation of polyester (the displacing alcohol). The reaction can then be conveniently run at a temperature at or below the boiling point of the displacing alcohol but well above that of the displaced alcohol, and is usually run in a temperature range similar to that for direct esterification. The ester interchange reaction is typically run in the presence of a diluent, for example, an inert organic solvent such as chloroform or tetrachloroethane, and in the presence of a base, for example a tertiary organic base such as pyridine. Typical catalysts used when ester interchange involves alcoholysis are weak bases such as carbonates or alkoxides of sodium, lithium, zinc, calcium, magnesium or aluminum, whereas catalysts such as antimony oxide, titanium butoxide or sodium acetate are often used when acidolysis occurs in the interchange reaction. Diol derivatives such as an acetate can be used effectively when it is desired to conduct acidolysis. Maintenance of high temperature is an important aspect of esterification, particularly toward the end of the reaction. As a consequence, thermal ester scission competes with polymer growth as the prevailing result of the process, which places an upper limit on the molecular weight which can be achieved through the use of melt polymerization. The molecular weight of polyester can be increased by adding a chain coupling agent, such as diphenyl carbonate, to the melt reaction mixture just prior its completion. To achieve higher weight by solid state polymer-ization, polyester product of intermediate weight can be heated in a vacuum or stream of inert gas, first to a temperature where it crystallizes and then to a temperature close to its melting point. Polyesters can also be produce by a ring-opening reaction of cyclic esters or lactones, for which organic tertiary bases and alkali and alkaline earth metals, hydrides and alkoxides can be used as initiators. Advantages offered by this type of reaction are that it can be run at lower temperatures, frequently under 100° C., and there is no need to remove a condensation product from the reaction.

The polyesters may exhibit a crystallinity sufficient to impact the chemical resistance, heat resistance and tensile properties of the polyesters. The one or more poly esters preferably exhibit an intrinsic viscosity such that the intrinsic viscosity of the polycarbonate is matched at processing conditions. The one or more polyesters may exhibit an intrinsic viscosity of about 0.35 dl/g or greater. The one or more polyesters may exhibit an intrinsic viscosity of about 1.20 dl/g or less or about 1.10 dl/g or less. The crystallinity may be about 25 weight percent or greater based on weight of the polyesters or about 30 weight percent or greater. The crystallinity may be about 60 weight percent or less based on the weight of the polyesters. The one or more polyesters are present in sufficient amount to improve the chemical resistance of the composition. The one or more polyesters may be present in an amount of about 5 percent by weight or greater based on the weight of the composition or about 10 percent by weight or greater. The one or more polyesters may be present in an amount of about 95 percent by weight or less of the invention, about 75 percent by weight or less, about 70 percent by weight or less or about 65 percent by weight or less based on the weight of the composition.

The composition may further comprise a core shell polymer. The core shell polymer may have reactive groups on the surface that react with the functional groups of the polyester. Any core shell rubber that improves the impact and environmental stress crack resistance properties of the composition may be utilized in the composition. The core shell rubber preferentially locates in the ester phase where polyesters are present. A core shell rubber comprises particles having a core of elastomeric material and a shell of a protective material. The core comprises a material that improves the impact properties of the compositions. The core comprises a material that exhibits a low glass transition temperature. The glass transition temperature of the core is sufficiently low to improve the impact properties of the composition. The glass transition temperature may be about 0° C. or less, about −25° C. or less, or about −40° C. or less. Exemplary core materials include siloxanes, silicones, ethylene, propylene, butadiene, acrylates, methacrylates and the like. Preferred core materials contain polysiloxane chains.

The shell is a relatively rigid polymer and may contain reactive groups that react with the polyester. Any reactive group that reacts with the reactive groups in the polyester may be used. Preferred reactive groups on the polyester are acid and hydroxyl groups. Exemplary reactive groups on the surface of the shell of the core shell rubber include glycidyl, maleic anhydride, and the like. Preferably the reactive groups on the surface of the shell of the core shell rubber are glycidyl groups. The shell further comprises polymer chains derived from one or more monomers that form rigid polymer chains. Any monomers which form rigid polymer chains may be utilized. The monomers may polymer-ize by free radical polymerization. The monomers may be capable of polymerizing in emulsion polymerization processes. Exemplary classes monomers are alkyl (meth) acryl-ates, styrenics, acrylonitriles, and the like. Exemplary alkyl (meth) acrylates include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate, n-butyl acrylate may be preferred. The shell may be prepared from alkyl (meth)acrylates, crosslinkers and graft-active monomer units. Multifunctional compounds may be used as crosslinkers. Examples include ethylene glycol dimethacrylate, propylene glycol dimeth acrylate, 1,3-butylene glycol dimeth-acrylate and 1,4-butylene glycol dimethacrylate. The following compounds individually or in mixtures may be used for inserting graft-active sites: allyl methacrylate, triallyl cyan-urate, triallyl isocyanurate, allyl methacrylate. Allyl methacrylate may also act as crosslinker. These compounds may be used in amounts of about 0.1 to about 20 percent, based on the weight of core shell rubber. The preferred graft shell includes one or more (meth)acrylic acid ($C_1$-$C_8$)-alkyl esters, especially methyl methacrylate copolymerized with glycidyl(meth)acrylate.

The core may have grafting sites on its outer surface to facilitate bonding of the shell to the core. The core is a particle having a sufficient size to positively impact the impact properties and the environmental stress crack resistance of the composition of the invention. The particles size may be a median particle size (d50 value) of about 0.05 microns or greater or about 0.1 microns or greater. The particles size may be a median particle size (d50 value) of about 5.0 microns or less, about 2.0 microns or less or about. 1.0 micron or less. The relative weight ratio of the core and shell are selected to achieve the desired properties of the composition. The weight ratio of the core to the shell may be about 1:99 or greater, about 2:98 or greater or about 3:97 or greater. The weight ratio of the core to the shell is about 95:5 or less, about 90:10 or less or about 80:20 or less. The core shell rubber may be present in the composition in an amount of about 0.5 percent by weight of greater based on the weight of the composition, about 1.0 percent by weight or greater, about 2.0 percent by weight or greater, about 3.0 percent by weight or greater or about 5 percent by weight or greater. The core shell rubber may be present in the composition in an amount of about 25 percent by weight or less based on the weight of the composition, about 20 percent by weight or less, about 15 percent by weight or less, about 12 percent by weight or less or about 10 percent by weight or less.

The polycarbonate resin or blend of polycarbonate and polyester resins contain polydimethyl siloxanes modified with one or more of acrylate, hydroxyl or epoxy groups. The polydimethyl siloxanes modified with one or more of acrylate, hydroxyl or epoxy groups are present to enhance the strength of the bond between substrates molded from polycarbonate resin or blend of polycarbonate and polyester resins and liquid silicon rubbers. Any polydimethyl siloxane having one or more of acrylate, hydroxyl or epoxy groups may be used in the composition and articles disclosed. Polydimethyl siloxanes comprise compounds having a backbone which corresponds to the formula

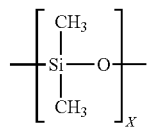

wherein x represents the number of units in the backbone. In the formula x can be 2 or greater, 4 or greater or 10 or greater, and 1000 or less, 400 or less, or 200 or less. Some modified polydimethyl siloxanes correspond to the formula:

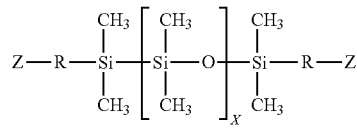

wherein R is an alkylene group, x is as described hereinbefore, and Z is a hydroxyl, epoxy or acrylate group. Acrylate modified polydimethylsiloxanes may correspond to the formula:

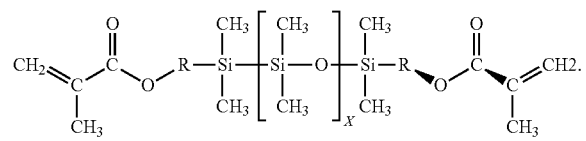

R may be a $C_{1-6}$ alkylene group, a $C_{1-4}$ alkylene group or a $C_{2-3}$ alkylene group. Particular alkylene groups include ethylene, propylene or butylene groups. The modified polydimethylsiloxanes may be coated onto a carrier. Any carrier that facilitates dispersion of the modified polydimethylsiloxanes into the polycarbonate resins or blends of polycarbonate or polyester resins may be used. Exemplary carriers may include silica, such as fumed silica, or the like. The carrier may be in particulate form. The particle size may be 0.1 microns or greater or 0.2 microns or greater. The particle size may be 1.0 microns or less or 0.5 microns or less. The modified polydimethylsiloxanes may be present in a sufficient amount to enhance the adhesion of cured silicone rubber to molded substrates of polycarbonate resins or blends of polycarbonate or polyester resins. The modified polydimethylsiloxanes may be present in an amount of about 0.1 percent by weight of the polycarbonate resins or blends of polycarbonate or polyester resins based compositions or about 0.5 percent by weight or greater. The modified polydimethyl-siloxanes may be present in an amount of about 2.0 percent by weight of the polycarbon-ate resins or blends of polycarbonate or polyester resins based compositions, or about 1.0 percent by weight or less. The modified polydimethylsiloxanes may be dispersed through-out the compositions containing the polycarbonate resins or blends of polycarbonate or polyester resins. The modified polydimethylsiloxanes may be dispersed throughout the compositions containing the polycarbonate resins or blends of polycarbonate or polyester resins with a higher concentration at the surface of articles prepared from the compositions. The modified polydimethylsiloxanes may be preferentially located at or near the surface of articles prepared from the compositions containing the polycarbonate resins or blends of polycarbonate or polyester resins.

The polycarbonates or blends thereof may contain one or more flame retard-ants commonly used in polycarbonate compositions. The flame retardant may be any flame retardant known for use in polycarbonate based compositions which provide flame retardant properties and which do not negatively impact the impact, heat resistance and environmental stress crack resistance properties of the composition. Flame retardants may be used in a sufficient amount to meet the flame retardancy requirements for the final use and in an amount that does not deleteriously impact the impact, heat resistance and environmental stress crack resistance properties of articles prepared from the compositions. Exemplary flame retardants include halogenated compounds, charring salt flame retardants, phosphorous containing compounds, an oligomeric phosphates, poly(block-phosphonato-esters), and/or a poly(block-phosphonato-carbonates) see U.S. Pat. No. 7,645,850 which is incorporated in its entirety. Preferable oligomeric phosphates include bisphenol-A bis(diphenyl phosphate) (BAPP). Preferred classes of flame retardants are halogenated flame retardants. Preferred classes of flame retardants are brominated flame retardants. Exemplary flame retardants include brominated polycarbonates, such as tetrabromobisphenol A polycarbonate oligomer, polybromophenyl ether, brominated BPA polyepoxide, brominated imides, halogenated polyacrylates, such as poly (haloaryl acryl-ate), poly(haloaryl methacrylate), brominated polystyrenes such as polydibromostyrene and polytribromostyrene, decabromobiphenyl ethane, tetrabromobiphenyl, brominated alpha, omega-alkylene-bis-phthalimides, such as. N,N'-ethylene-bis-tetrabromophthal-imide, oligomeric brominated carbonates, especially carbonates derived from tetrabromo-bisphenol A, which, if desired, are end-capped with phenoxy radicals, or with brominated phenoxy radicals, or brominated epoxy resins. Mixtures of halogenated flame retardants may be utilized in the compositions of the invention. Exemplary preferred halogenated flame retardants include brominated polyacrylates, brominated polystyrenes and tetrabromobisphenol A polycarbonate oligomers. The one or more flame retardants may be present in an amount of about 0.1 percent by weight or greater based on the weight of the composition, about 1 percent by weight or greater or about 5 percent by weight or greater. The one or more flame retardants may be present in an amount of about 30 percent by weight or less based on the weight of the composition, about 20 percent by weight or less. The composition may further comprise a synergist, particularly inorganic antimony compounds. Such compounds are widely available or can be made in known ways. Typical, inorganic synergist compounds include $Sb_2O_5$, $Sb_2O_3$, sodium antimonite and the like. Especially preferred is antimony trioxide ($Sb_2O_3$). Synergists may be used at about 0.5 to about 15 by weight percent based on the weight percent of polycarbonate or polycarbonate and polyester resins in the final composition.

The composition may further comprise a fluorinated antidrip agent. Antidrip means to reduce the tendency of the composition to form burning drips in the event of a fire. Fluorinated polyolefins known in the art as antidrip agents may be used in the compositions of the invention. Exemplary fluorinated polyolefins are described in EP-A 0 640 655. They are marketed under the brand name Teflon® 30N by DuPont. The fluorin-ated polyolefins may be employed both in the pure form and in the form of a coagulated mixture of emulsions of the fluorinated polyolefins with emulsions of the graft polymers or with an emulsion of a copolymer, preferably based on styrene/acrylonitrile, the fluorinated polyolefin being mixed as an emulsion with an emulsion of the graft polymer or of the copolymer and the mixture then being coagulated. The fluorinated polyolefins may furthermore be employed as a precompound with the graft polymer (component B) or a copolymer, preferably based on styrene/acrylonitrile. The fluorinated polyolefins are mixed as powders with a powder or granules of the graft polymer or copolymer and the mixture is compounded in the melt in general at temperatures of about 200 to about 330° C. in conventional units, such as internal kneaders, extruders or twin-screw extruders. The fluorinated polyolefins may also be employed in the form of a masterbatch, which is prepared by emulsion polymerization of at least one monoethylenically unsaturated monomer in the presence of an aqueous dispersion of the fluorinated polyolefin. Preferred monomer components are styrene, acrylonitrile and mixtures thereof. The polymer is employed as a free-flowing powder, after acidic precipitation and subsequent drying. The coagulates, precompounds or masterbatches may have solids contents of fluorinated polyolefin of about 5 to about 95 weight percent, or about 7 to about 60 weight percent. The one or more anti drip agents may be present in an amount of about 0 percent by weight or greater based on the weight of the composition, about 0.05 percent by weight or greater or about 0.1 percent by weight or greater. The one or more anti drip agents may be present in an amount of about 5 percent by weight or less based on the weight of the composition, about 2 percent by weight or less or about 1 percent by weight or less.

The composition may comprise one or more elastomeric polymers for the purpose of improving the notch sensitivity and/or low temperature impact resistance, some of these are commonly referred to as rubbers. Any elastomeric polymer known in the art for use in thermoplastic compositions to improve the notch sensitivity and/or low temperature impact resistance of such compositions may be used. Such rubber materials may have elastic properties and have glass transition temperatures (Tg's) about 0° C. or less, about −10° C. or less, about −20° C. or less, or about −30° C. or less. Exemplary rubbers include the well-known homopolymers and copolymers of conjugated dienes, particularly butadiene; as well as other rubbery polymers such as olefin polymers, particularly copolymers of ethylene, propylene and optionally a nonconjugated diene; acrylate rubbers, particularly homopolymers and copolymers of alkyl acrylates having from 4 to 6 carbons in the alkyl group; or block copolymer elastomers, such as styrene alkadiene block copolymers, wherein preferred alkadienes include isoprene and butadiene, and hydrogenated block copolymers. Mixtures of the rubbery polymers may be employed. Preferred rubbers are homopolymers of butadiene and copolymers thereof with up to about 30 percent by weight styrene. Such copolymers may be random or block copolymers and in addition may be hydrogenated to remove residual unsaturation. Also preferred are rubbery polymers prepared from mono-olefins with optional nonconjugated diene monomers due to their resistance to weathering as compared to conjugated diene rubbers. Where incorporated, the rubbers are preferably grafted with an amount of a graft polymer or selected based on their composition such that they will be located in the carbonate polymer phase. As taught in U.S. Pat. No. 5,087,663, the selection of comono-mer type and amount for the monovinylidene aromatic copolymer and grafted rubber composition helps determine whether a selected grafted rubber component will locate in the carbonate polymer phase and/or at the interface of the two phases during the melt mixing of the components. The one or more elastomeric polymers may be present in an amount of about 2 percent by weight or greater, about 3 percent by weight or greater, or about than 4 percent by weight or greater based on the weight of the composition. The one or more elastomeric polymers may be present in an amount of about 25 parts by weight or less, about 15 parts by weight or less, or about 10 parts by weight or less based on the weight of the composition.

The compositions may contain internal mold release compounds. Any compound that enhances the release of molded substrates prepared from polycarbonate resin or blends of polycarbonate and polyester resins from a mold and which does not interfere with the bond of liquid silicon rubber compositions to the molded substrate may be used. Examples of mold release agents include higher fatty acids, higher fatty acid esters of mono- or polyhydric alcohols, natural animal waxes such as bees wax, natural vegetable waxes such as carnauba wax, natural petroleum waxes such as paraffin wax, natural coal waxes such as montan wax, olefin waxes, silicone oils, and organopoly-siloxanes. Especially preferred of these are higher fatty acids and higher fatty acid esters of mono- or polyhydric alcohols. The higher fatty acid esters preferably are partial or complete esters of substituted or unsubstituted, mono- or polyhydric alcohols having 1-20 carbon atoms with substituted or unsubstituted, saturated fatty acids having 10-30 carbon atoms. Examples of the partial or complete esters of mono- or polyhydric alcohols with saturated fatty acids include stearic monoglyceride, stearic diglyceride, stearic triglyceride, stearic acid monosorbitate, stearyl stearate, behenic monoglyceride, behenyl behenate, pentaerythritol monostearate, pentaerythritol tetrastearate, pentaerythritol tetrapelargon-ate, propylene glycol monostearate, stearyl stearate, palmityl palmitate, butyl stearate, methyl laurate, isopropyl palmitate, biphenyl biphenate, sorbitan monostearate, and 2-ethylhexyl stearate. Preferred are stearic monoglyceride, stearic triglyceride, pentaerythri-tol tetrastearate, and behenyl behenate. The higher fatty acids may be substituted or unsubstituted, saturated fatty acids having 10-30 carbon atoms. Examples of such saturated fatty acids include myristic acid, lauric acid, palmitic acid, stearic acid, and behenic acid. These mold release agents may be used alone, or a mixture of two or more thereof may be used. Exemplary mold release agents include organic stearates. The mold release agent, per 100 parts by weight of polycarbonate resin or a blend of polycarbonate and polyester resins may be used in amounts of about 0.0001 percent by weight or more, about 0.01 percent by weight or more, about 0.1 percent by weight or more, and about 2 percent by weight or less, about 1 percent by weight or less, or about 0.5 percent by weight or less.

The composition may further contain at least one or more additives commonly used in polycarbonate based compositions. For example, one such additive comprises one or more lubricants, for example mineral oil, epoxidized soybean oil, or the like; a nucleating agent; an anti-static agent; a stabilizer; a filler and/or a reinforcing material such as glass fibers, carbon fibers, metal fibers, metal coated fibers, thermoset fibers, glass beads, mica, silicates, quartz, talc, titanium dioxide, and/or wollastonite alone or in combinations; a dye; or a pigment. One such stabilizer is present to minimize ester-carbonate interchange. Such stabilizers are known in the art, for example see U.S. Pat. Nos. 5,922,816; 4,532,290; 4,401,804, all of which are incorporated herein by reference, and may comprise certain phosphorous containing compounds that include phosphoric acid, certain organic phosphorous compounds such as distearyl pentaerythritol diphosphate, mono or dihydrogen phosphate, or mono-, di-, or trihydrogen phosphate compounds, phosphate compounds, and certain inorganic phosphorous compounds such as monosodium phosphate and monopotassium phosphate, silyl phosphates, and silyl phosphate derivatives, alone or in combination and present in an amount effective to inhibit ester-carbonate interchange in the composition.

The compositions may contain fillers or reinforcing fibers. Exemplary fillers include inorganic fillers, for example, talc, mica, kaolin, diatomaceous earth, calcium carbonate, calcium sulfate, barium sulfate, and potassium titanate. Reinforcing fibers are used to enhance the properties of substrates prepared from the compositions. Any reinforcing fibers that improve the properties of substrates made utilizing the fibers may be used in the compositions. Fibers may be utilized to improve one or more of the following properties: impact resistance, as demonstrated by notched Izod; modulus, as demonstrated by tensile modulus and flex modulus; tensile strength; improved creep resistance as determined by test method ASTM D2990 and the like. Exemplary fibers include glass fibers, carbon fibers, metal based fibers, polymeric fibers, and the like. Exemplary metal based fibers include stainless steel, and the like. Exemplary polymeric fibers include polyamide fibers, cellulose ether fibers, polyolefin fibers and the like. This disclosure contemplates the use of a mixture of types of fibers, for instance glass and stainless steel fibers or glass fibers and carbon fibers. Preferred classes of fibers are glass and polymeric fibers. Even more preferred are glass fibers. Fillers and/or reinforcing fibers may be present in an amount equal to or greater than about 0.5 percent by weight, equal to or greater than about 1 part by weight, equal to or greater than about 2 percent by weight, equal to or greater than about 5 percent by weight, or equal to or greater than about 10 percent by weight based on the weight of the composition. The fillers and/or reinforcing fibers may be present in an amount equal to or less than about 60 percent by weight, equal to or less than about 40 percent by weight, equal to or less than about 30 percent by weight, equal to or less than about 25 percent by weight, or equal to or less than about 20 percent by weight based on the weight of the composition.

The compositions are produced by mixing the particular components in a known manner and melt-compounding and/or melt-extruding them at temperatures of from 200° C. to 300° C. in conventional units such as internal kneaders, extruders and twin-screw extruders. The individual components may be mixed in a known manner both in succession and simultaneously and both at approximately 23° C. (room temperature) and at a higher temperature. The compositions may be injected into a mold to form a substrate of the desired shape.

Substrates comprising one or more polycarbonate resins or blends of polycarbonate and polyester resins containing polydimethyl siloxanes modified with one or more of acrylate, hydroxyl or epoxy groups may have silicone rubbers overmolded onto their surface or a portion of their surface. The silicone rubber molded to the substrates prepared from compositions containing polycarbonate resins or blends of polycarbonate and polyester resins is an addition cured silicone rubber which may contain a tackifier component. The silicone rubber may be obtained by curing an adhesive silicone rubber composition comprising (a) an alkenyl group-containing organopolysiloxane, (b) an organohydrogenpolysiloxane having at least two hydrogen atoms each directly attached to a silicon atom in a molecule, (c) an addition reaction catalyst, and optionally (d) a tackifier component which is typically a compound containing at least one hydrogen atom directly attached to a silicon atom in a molecule and having a trialkoysilyl group, glycidyl group or acid anhydride group or a phenyl skeleton.

The organopolysiloxane containing an alkenyl group which may be selected from well-known organopolysiloxanes conventionally used as a major component of addition curing type silicone rubber compositions, typically having a viscosity of about 100 to 100,000 centipoise at room temperature. Preferred organopolysiloxanes are represented by the general formula: Ra SiO(4–a)/2 wherein R is a substituted or unsubstituted monovalent hydrocarbon group, preferably having 1 to 8 carbon atoms. Examples of the hydrocarbon group represented by R include alkyl groups such as methyl, ethyl and propyl; alkenyl groups such as vinyl, propenyl and butenyl; aryl groups such as phenyl and xylyl; and halo- or cyano-substituted hydrocarbon groups such as 3,3,3-trifluoropropyl. The monovalent hydrocarbon groups may be identical or different as long as an alkenyl group is contained in the organopolysiloxane molecule. The content of alkenyl group is preferably 0.01 to 10 mole percent, especially 0.1 to 1 mole percent of the entire R groups. Letter a is a number of 1.9 to 2.4. The organopolysiloxane may be a linear or branched further containing a RSiO3/2 unit or SiO4/2 unit. The substituent on the silicon atom may be any of the above-mentioned groups. It is desirable to introduce a vinyl group among the alkenyl groups and a methyl or phenyl group among other substituent groups. Illustrative, non-limiting examples of the organopolysiloxane are given below.

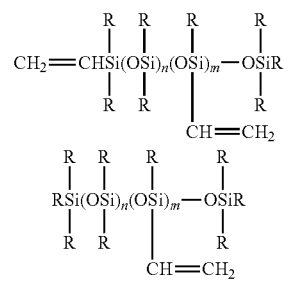

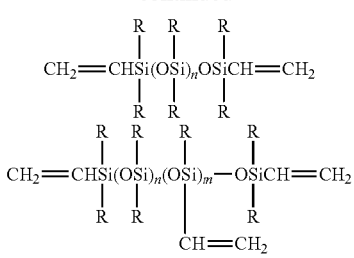

In these formulae, R is as defined above (excluding an aliphatic unsaturated group), and letters m and n are positive numbers meeting m+n=100 to 5000 and m/(m+n)=0.001 to 0.1. The organopolysiloxanes may be prepared by known methods, such as effecting equilibration reaction between an organocyclopolysiloxane and a hexaorganodisiloxane in the presence of an alkali or acid catalyst.

The organohydrogenpolysiloxane serves as a crosslinking agent by reacting with the organopolysiloxane containing an alkenyl group. The organohydrogen-polysiloxanes may comprise linear, cyclic and/or branched structures. It should have at least two hydrogen atoms each directly attached to a silicon atom in a molecule. The substituent or substituents attached to a silicon atom other than hydrogen are the same as the substituents described for organopolysiloxane containing an alkenyl group. organohydrogenpolysiloxane is preferably added in an amount to provide 0.4 to 5 equivalents, especially 0.8 to 2 equivalents per alkenyl group in organopolysiloxane containing an alkenyl group. Less than 0.4 equivalents of organohydrogenpolysiloxane on this basis would result in cured silicone rubber having a too low crosslinking density and hence, less heat resistance. More than 5 equivalents of the organohydrogenpolysiloxane would give rise to a bubbling problem due to dehydrogenation reaction, also adversely affecting heat resistance. The organohydrogen polysiloxanes may be prepared by known methods, such as by equilibrating octamethyl-cyclotetrasiloxane and/or tetramethylcyclo-tetrasiloxane and a compound containing a hexa-methyldisiloxane or 1,1-dihydro-2,2,3,3-tetramethyldisiloxane unit which will become a terminal group in the presence of a catalyst such as sulfuric acid, trifluoromethane sulfonic acid, and methanesulfonic acid at a temperature between −10° C. and +40° C.

The addition reaction catalyst which is selected from platinum, platinum compounds and rhodium compounds. The catalyst promotes a curing addition reaction or hydrosilation between components (a) and (b. Exemplary catalysts are platinum black, chloroplatinic acid, alcohol modified chloroplatinic acid, complexes of chloroplatinic acid with olefins, aldehydes, vinylsiloxanes or acetylene alcohols, and rhodium complexes. The amount of the catalyst added is determined in accordance with a desired curing rate. The catalyst concentration may be in the range of 0.1 to 1000 ppm, preferably 1 to 200 ppm of platinum or rhodium based compounds based on the total components.

The bond of modified polycarbonate resin or blends of polycarbonate and polyester resins to silicone rubber, may be enhanced with a tackifier component. The tackifier is a compound having at least one hydrogen atom directly attached to a silicon atom in a molecule and another bond in addition to a siloxane bond. The minimum requirement for this compound is that it contains at least one hydrogen atom directly attached to a silicon atom in a molecule and it improves affinity to an organic resin (polycarbonate resin) to which the silicone rubber is to be joined. Conventional tackifier components known in the art may be used. The tackifier may be a compound containing at least one hydrogen atom directly attached to a silicon atom and at least one member selected from the group consisting of an alkoxysilyl group, glycidyl group and acid anhydride group. Examples of this compound are given below.

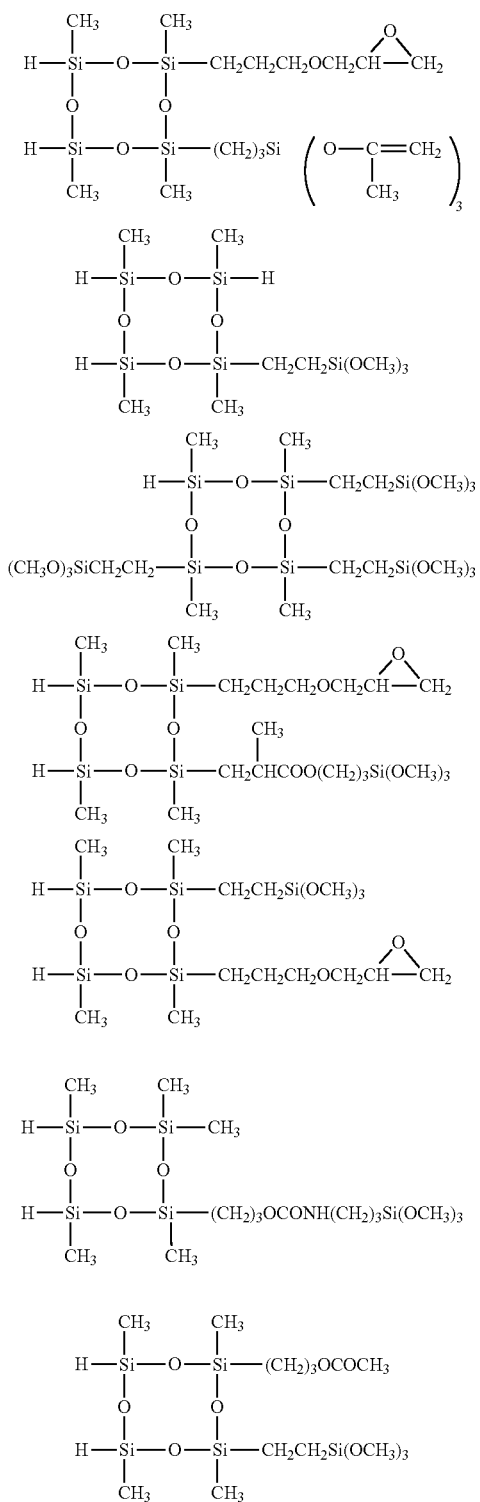

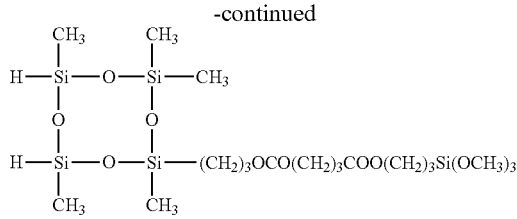

Any of these compounds may be used as the tackifier to assist in achieving a sufficient bonding force between silicone rubber and the substrate. The amount of tackifier may be about 0.01 to 50 parts by weight, about 0.1 to 5 parts by weight per 100 parts by weight of organopolysiloxane containing an alkenyl group. Less than 0.01 part of tackfier is too small to provide adherence to the modified polycarbonate resin whereas more than 50 parts of tackifier may deteriorate the physical properties of silicone rubber.

The silicone rubber composition may further include finely divided silica having a specific surface area of at least 50 m$^2$/g in an amount of 0 to 100 parts, preferably 5 to 50 parts, more preferably 10 to 40 parts by weight per 100 parts by weight of the total of organopolysiloxane containing an alkenyl group and organohydrogenpolysiloxane. The finely divided silica is to impart strength to an elastomer resulting from curing of the silicone rubber composition and functions to reinforce silicone rubber. Exemplary of hydrophilic silica are Aerosil 130, 200 and 300 (commercially available from Nippon Aerosil K.K. and Degussa), Cabosil MS-5 and MS-7 (Cabot Corp.), Rheorosil QS-102 and 103 (Tokuyama Soda K.K.), and Nipsil LP (Nippon Silica K.K.). Exemplary of hydrophobic silica are Aerosil R-812, R-812S, R-972 and R-974 (Degussa), Rheorosil MT-10 (Tokuyama Soda K.K.), and Nipsil SS series (Nippon Silica K.K.).

The curing time of the silicone rubber composition may be controlled in order enhance the function of the silicone rubber. A suitable control agent selected from vinyl-containing organopolysiloxanes such as vinylcyclo-tetrasiloxane, triallylisocyanurate, alkyl maleates, acetylene alcohols and silane or siloxane modified derivatives thereof, hydroperoxides, tetramethylethylenediamine, benzotriazole and mixtures thereof may be present. Also useful are platinum group compounds combined with organic resins and silicone resins. Moreover, suitable additives may be blended in the silicone rubber composition. Such additives include non-reinforcing fillers such as ground quartz, diatomaceous earth, and calcium carbonate, coloring agents including inorganic pigments such as Cobalt Blue and organic dyes, and agents for improving heat resistance and flame retardance such as cerium oxide, zinc carbonate, manganese carbonate, iron oxide, titanium oxide, and carbon black.

The silicone rubber composition in uncured state is integrally molded over the polycarbonate resin by any desired technique, for example, by placing the uncured silicone rubber composition in a desired form on the substrate and heating the assembly at a temperature below the softening temperature of the resins used to form the substrate. Placement of the uncured silicone rubber composition in a desired form can be done by molding, coating or dipping. Another technique is by placing the uncured silicone rubber composition on a preform of the substrate and heating and compressing the assembly at a temperature below the softening temperature of the resins used to form the substrate. Alternatively, using an injection molding machine, the polycarbonate resin is first injection molded in a mold and then the silicone rubber composition is then heated and injected into the same mold.

In molding the polycarbonate resins or blend of polycarbonate and polyester resins into a preform, any of molding techniques commonly used for conventional thermoplastic resins may be employed. One exemplary known convenient technique includes blending the polycarbonate resin or blend of polycarbonates and polyesters with other components of the composition as disclosed herein, introducing the resulting composition into a mold heated above the softening point of the resins, and cooling the mold to below the softening point of the resins. This technique generally uses a machine known as an injection molding machine or transfer molding machine. Thereafter, the silicone rubber composition is molded over the formed substrate. At this point, the silicone rubber composition may be liquid, putty or paste in uncured state. Desired for ease of molding is a liquid or paste known as a liquid silicone rubber composition to those skilled in the art. The coated substrate is exposed to conditions at which the silicone rubber composition undergoes cure. The silicone rubber composition coated on the substrate is exposed to temperatures at which the composition undergoes cure for a time sufficient to cure the composition. The curing temperature may be any temperature at which the silicone rubber undergoes cure. Exemplary temperatures for the cure are about 105° C. or greater, about 115° C. or greater or about 125° C. or greater. Exemplary temperatures for the cure are about 205° C. or less, about 175° C. or less or about 135° C. or less. The curing time may be any time period at the temperature used at which the silicone rubber undergoes cure. Exemplary curing times are about 0.5 minutes or greater, about 2 minutes or greater or about 5 minutes or greater. Exemplary curing times are about 30 minutes or less, about 15 minutes or less or about 10 minutes or less.

The cured silicone rubber is overmolded onto the portion of the substrate which requires a modified surface. The cured silicone rubber may be overmolded onto the entire surface of the substrate or only the portion that requires a modified surface. The silicone rubber thickness on the substrate may be any thickness that modifies the surface to the desired properties. The thickness may vary across the substrate to provide different surface properties at different locations of the substrate. The thickness of the silicone rubber layer may be about 0.4 mm or greater, about 1.0 mm or greater or about 1.5 mm or greater. The thickness of the silicone rubber layer may be about 4.0 mm or less, about 3.0 mm or less or about 2.0 mm or less.

Described is a polycarbonate based resin/silicone rubber integrally molded article in which a substrate prepared from modified polycarbonate resins or blend of polycarbonate and polyester resins, and an addition type silicone rubber is overlaid, joined and integrated to the substrate so that a strong bond is established between the substrate and the silicone rubber. This molded article finds application as parts in electric, electronic, automotive and precision equipment fields since it takes advantage of the properties of both polycarbonate resin and silicone rubber.

The carbonate blend compositions overmolded with silicone rubber may, for example, be used to produce the following fabricated articles or shaped articles: medical applications such as connectors, valves, surgical instruments, trays, lab ware, diagnostics, drug delivery housings, external defibrillators, patient monitoring devices, medical imaging devices, diagnostic equipment, respiratory housings, hospital bed frames and components, interior trim for rail vehicles, interior and exterior automotive applications, enclosures for electrical devices containing small transformers, enclosures for information dissemination and transmission devices, enclosures and cladding for medical purposes, massage devices and enclosures therefore, toy vehicles for children, sheet wall elements, enclosures for safety equipment, hatchback spoilers, thermally insulated transport containers, apparatus for keeping or caring for small animals, articles for sanitary and bathroom installations, cover grilles for ventilation openings, articles for summer houses and sheds, and enclosures for garden appliances. Preferred fabricated articles include housings or enclosures such as for: power tools, appliances, consumer electronic equipment such as TVs, VCRs, DVD players, web appliances, electronic books, etc., or housings or enclosures such as for: information technology equipment such as telephones, computers, monitors, fax machines, battery chargers, scanners, copiers, printers, hand held computers, flat screen displays, etc.

genpolysiloxane having at least two hydrogen atoms each directly attached to a silicon atom in a molecule, (c) an addition reaction catalyst, selected from platinum and platinum compounds, is applied to one surface of the plaques in a strip of 2 cm wide, 4 cm long and having a thickness of 0.4 mm for plaques without glass fibers and 2.0 mm for plaques with glass fiber. The plaques with the applied silicone rubber composition is cured for the time and the temperature listed below, cooled and a peel test according to ASTM D3330. The results are compiled in the following Table 2. In Table 1 the 3 and 15 MFR polycarbonates are provided in pellet form. Examples 6 to 11 further contain 20 percent by weight of glass fibers based on the weight of the polycarbonate blend. In Table 1 are amounts are percent by weight of the polycarbonate blend composition. The Polydimethyl siloxane hydroxyl functionalized is coated on fumed silica particles.

TABLE 1

| Ingredient | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Polycarbonate 15 MFR | 30 | 68 | 68 | 68 | 68 | 67.2 | 67.0 | 66.7 | 66.5 | 66.5 | 66.7 |
| Polycarbonate 3 MFR | 59.5 | 16 | 13.6 | 13.0 | 13.0 | | | | | | |
| Polycarbonate Powder 10 MFR | 10 | 15 | 15 | 15 | 15 | 10 | 10 | 10 | 10 | 10 | 10 |
| Glass Fiber | | | | | | 20 | 20 | 20 | 20 | 20 | 20 |
| Benzotriazole UV Absorber | 0.15 | 0.15 | 0.15 | 0.15 | 0.15 | | | | | | |
| Thermal Stabilizer | 0.1 | 0.1 | 0.1 | 0.1 | 0.1 | 0.1 | 0.1 | 0.1 | 0.1 | 0.1 | 0.1 |
| Octyldodecyl stearate | 0.2 | 0.2 | 0.2 | 0.2 | 0.2 | | | | | | |
| Polydimethyl siloxane hydroxyl functionalized | | | | | | | | | | 0.5 | 0.5 |
| Organopolysiloxane epoxy functionalized | | 0.5 | | 0.5 | | | | | | | |
| Polydimethyl siloxane acrylate functionalized | | | 0.5 | | | | | 0.5 | 0.5 | | |
| Impact modifier 1 | | | | | | 2 | 2 | | | 2 | 2 |
| Impact modifier 2 | | | | | | | | 2 | 2 | | |
| Flame retardant | | | | | | 0.19 | 0.19 | 0.19 | 0.19 | 0.19 | 0.19 |
| Penta-Erythritol-Tetra-Stearate | | | | | | 0.25 | 0.25 | 0.25 | 0.25 | 0.25 | 0.25 |
| Titanium dioxide | | | 3.0 | 3.0 | 3.0 | 0.2 | | 0.2 | | | 0.2 |
| Zinc sulfide | | | | | | | 0.4 | | 0.4 | 0.4 | |
| BP-800 | | | | | | 0.03 | 0.04 | 0.03 | 0.04 | 0.04 | 0.03 |
| Violet-B dye | | | | | | .001 | .003 | .001 | .003 | .003 | .001 |
| Red E2G dye | | | | | | | | | | | |
| Carbon Black | 0.2 | 0.2 | | | | | | | | | |
| tint | 0.09 | 0.09 | | 0.03 | 0.03 | | | | | | |

ILLUSTRATIVE EMBODIMENTS

The following examples are provided to illustrate the invention, but are not intended to limit the scope thereof. All parts and percentages are by weight unless otherwise indicated.

A number of test plaques are prepared for testing from the polycarbonate compositions listed below in Table 1. The test plaques are molded using the following conditions. The compositions are blended in a twin screw extruder at 260° C. and injected into a mold of the size 5 cm×5 cm×0.3 cm for unfilled resins and 5 cm×5 cm×2.0 cm for fiber reinforced resins. The blend is injected at 300° C., with an injection speed of 200 mm/sec and injection pressure of 2500 kgf/cm². The residence time in the mold is about 40 seconds. The plaques are removed and cooled. Thereafter a liquid silicone rubber composition comprising (a) an alkenyl group-containing organopolysiloxane, (b) an organohydro- Thermal Stabilizer—80:20 blend of a hindered phenol type anti-oxidant and a triphenylphosphite thermal stabilizer.

Impact modifier 1—Core shell rubber with a core consisting of a butadiene core and a shell consisting of styrene and methylmethacrylate.

Impact modifier 2—Core shell rubber with a core consisting of both siloxane (PDMS) and acrylate, with a shell consisting of methylmethacrylate.

Charring salt flame retardant—potassium salt of perfluorobutane sulphonate

In Table 2 the peel test data are compiled. The units of the data are Kg/cm. Examples 1 to 5 are cured for 5 minutes at either 115° C., 125° C. or 135° C. Examples 6 to 11 are cured at 130° C. for 80 seconds. The liquid silicon rubber is either transparent or white. The temperature and color of the liquid silicon rubber are listed for each experiment. Examples 1 to 5 are performed with both clear and white silicon rubber.

| Cure Temp ° C. - LSR type | 1 | 2 | 3 | 4 | 5 | 6 | 7 | 8 | 9 | 10 | 11 |
|---|---|---|---|---|---|---|---|---|---|---|---|
| 115 transparent | 1.7 | 1.9 | 1.7 | 1.6 | 1.8 | | | | | | |
| Standard Dev | 0.4 | 0.3 | 0.2 | 0.2 | 0.1 | | | | | | |
| 125 transparent | 1.3 | 1.3 | 1.5 | 1.6 | 1.8 | | | | | | |
| Standard Dev | 0.1 | 0.2 | 0.3 | 0.2 | 0.2 | | | | | | |
| 135 transparent | 1.0 | 0.8 | 0.8 | 0.9 | 1.3 | | | | | | |
| Standard Dev | 0.1 | 0.2 | 0.2 | 0.2 | 0.4 | | | | | | |
| 115 white | 1.4 | 1.6 | 1.8 | 1.6 | 1.8 | | | | | | |
| Standard Dev | 0.5 | 0.5 | 0.5 | 0.3 | 0.4 | | | | | | |
| 125 white | 1.3 | 1.5 | 1.4 | 1.8 | 1.7 | | | | | | |
| Standard Dev | 0.2 | 0.3 | 0.3 | 0.4 | 0.4 | | | | | | |
| 135 white | 1.1 | 1.4 | 1.3 | 1.0 | 1.4 | | | | | | |
| Standard Dev | 0.2 | 0.3 | 0.3 | 0.2 | 0.5 | | | | | | |
| 130 | | | | | | 7.53 | 11.40 | 9.23 | 11.78 | 13.10 | 13.13 |
| Standard Dev | | | | | | 4.60 | 2.97 | 3.33 | 2.43 | 0.28 | 0.42 |

The results of Examples 1 to 5 illustrate the following points. The addition of modifier to the polycarbonate improves the peel force about 30 percent or greater.

The results of Examples 6 to 11 illustrate the following points. Comparing the composition of example 6 to example 7, using 0.4% ZnS as the white pigment increased the peeling strength and reduced the standard deviation from 7.53 kg/cm of 0.2% TiO2 to 11.78 kg/cm, and from 4.60 to 2.97 kg/cm, respectively. Comparing the composition of example 8 to example 9, using 0.4% ZnS further agreed with the observation that it increased the peeling strength and reduced the standard deviation from 11.78 kg/cm of 0.2% TiO2 to 9.23 kg/cm, and from 2.43 to 3.33 kg/cm, respectively. This disclosed that ZnS retained higher peeling strength with less variations. Comparing example 11 to examples 6 through 10, shows that the addition of 0.5% organopolysiloxane into the composition elevated the peel strength and reduced the standard deviation regardless of white pigment, TiO2 or ZnS of 13.1~13.13 kg/cm and 0.28-0.42 kg/cm, respectively, indicating smaller fluctuations in the peel strength. A comparison of experiment 6 with experiments 8, 7 and 9, demonstrate peel strengths of 7.53, 9.23, 11.4 and 11.78 with standard deviations of 4.6, 3.33, 2.97, and 2.43, respectively. This data discloses that compositions with typical impact modifiers can only achieve certain adhesion strengths with high standard deviations which illustrate unstable bonding strengths.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. An article comprising: a molded substrate comprised of a composition comprising one or more polycarbonate resins or blends of polycarbonate and polyester resins; polydimethyl siloxanes modified with one or more of acrylate or hydroxyl groups in an amount of about 0.1 to less than 1.0 percent by weight; one or more reinforcing fibers present in an amount of about 0.5 to about 60 percent by weight; and one or more core shell rubbers present in an amount of about 0.5 to about 25 percent by weight; wherein the amounts are based on the weight of the composition, and wherein the polydimethyl siloxanes modified with one or more of acrylate or hydroxyl groups is disposed on a carrier, and a cured silicone rubber disposed on the surface or a portion of the surface of the molded substrate; wherein the one or more polycarbonate resins or blends of polycarbonate and polyester resins contain the polydimethyl siloxanes in sufficient amount such that the peel strength is increased.

2. The article according to claim 1, wherein the one of more polycarbonates blends of polycarbonate and polyester resins exhibit a composite melt flow rate of about 3 to 20.

3. The article according to claim 1, wherein the polydimethyl siloxanes are modified with the acrylate groups.

4. The article according to claim 1, wherein the one or more polycarbonate resins or blends of polycarbonate and polyester resins contain one or more pigments.

5. The article according to claim 1, wherein the one or more polycarbonate resins or blends of polycarbonate and polyester resins contain one or more internal mold release compounds.

6. The article according to claim 1, wherein the cured silicone rubber comprises the reaction product of an alkenyl group-containing organopolysiloxane and an organohydrogenpolysiloxane having at least two hydrogen atoms each directly attached to a silicon atom in a molecule.

7. A composition comprising one or more polycarbonate resins or blends of polycarbonate and polyester resins; polydimethyl siloxanes modified with one or more of acrylate or hydroxyl groups in an amount of about 0.1 to less than 1.0 percent by weight; one or more reinforcing fibers present in an amount of about 0.5 to about 60 percent by weight; and one or more core shell rubbers present in an amount of about 0.5 to about 25 percent by weight; wherein the amounts are based on the weight of the composition, and
   wherein the polydimethyl siloxanes modified with one or more of acrylate or hydroxyl groups is disposed on a carrier.

8. The composition according to claim 7, wherein the one or more polycarbonate resins or blends of polycarbonate and polyester resins contain one or more pigments.

9. The composition according to claim 8, wherein the one or more pigments is zinc sulfide or titanium dioxide.

10. The composition according to claim 7, wherein the one or more polycarbonate resins or blends of polycarbonate and polyester resins contain one or more internal mold release compounds in an amount of about 0.0001 to about 2 percent by weight.

11. The composition according to claim 7, wherein the carrier comprises fumed silica.

12. The composition according to claim 7, wherein the one or more core shell rubbers comprise a core and a shell, and wherein the core comprises polysiloxane chains.

13. The composition according to claim 7, wherein the one or more core shell rubbers comprise a core and a shell, and wherein the shell comprises a polymer with reactive groups including glycidyl or maleic anhydride.

14. The composition according to claim 7, wherein the one or more core shell rubbers comprise a core and a shell, wherein the core comprises polydimethyl siloxane and acrylate, and wherein the shell comprises methylmethacrylate.

15. A method comprising:
   a) molding a substrate from a composition comprising one or more polycarbonate resins or blends of polycarbonate and polyester resins; polydimethyl siloxanes modified with one or more of acrylate or hydroxyl groups in an amount of about 0.1 to less than 1.0 percent by weight; one or more reinforcing fibers present in an amount of about 0.5 to about 60 percent by weight; and one or more core shell rubbers present in an amount of about 0.5 to about 25 percent by weight; wherein the amounts are based on the weight of the composition, and wherein the polydimethyl siloxanes modified with one or more of acrylate or hydroxyl groups is disposed on a carrier;
   b) applying a mixture comprising one or more polysiloxanes containing one or more unsaturated groups, one of more polysiloxanes containing one or more S—H groups; and one or more platinum based catalysts to the surface or a portion of the surface of the substrate; and
   c) exposing the mixture of one or more polysiloxanes containing one or more unsaturated groups, one of more polysiloxanes containing one or more S—H groups; and one or more platinum based catalysts to conditions such that a cured silicone rubber layer is disposed on the surface or a portion of the surface of the substrate.

* * * * *